Aug. 7, 1934. W. H. CARRIER Re. 19,263

METHOD AND SYSTEM FOR VENTILATING AND ATTEMPERATING ENCLOSURES

Original Filed June 22, 1927 3 Sheets-Sheet 1

INVENTOR.
WILLIS H. CARRIER
BY
ATTORNEY

Aug. 7, 1934. W. H. CARRIER Re. 19,263

METHOD AND SYSTEM FOR VENTILATING AND ATTEMPERATING ENCLOSURES

Original Filed June 22, 1927 3 Sheets-Sheet 2

INVENTOR.
WILLIS H. CARRIER
BY
ATTORNEY

Aug. 7, 1934. W. H. CARRIER Re. 19,263

METHOD AND SYSTEM FOR VENTILATING AND ATTEMPERATING ENCLOSURES

Original Filed June 22, 1927 3 Sheets-Sheet 3

INVENTOR.
WILLIS H. CARRIER
BY
ATTORNEY

Reissued Aug. 7, 1934 Re. 19,263

UNITED STATES PATENT OFFICE 19,263

METHOD AND SYSTEM FOR VENTILATING AND ATTEMPERATING ENCLOSURES

Willis H. Carrier, Essex Fells, N. J., assignor to Carrier Engineering Corporation, Newark, N. J.

Original No. 1,775,749, dated September 16, 1930, Serial No. 200,665, June 22, 1927. Application for reissue April 23, 1932, Serial No. 607,205

28 Claims. (Cl. 98—33)

This invention relates to the heating, cooling and ventilation of enclosures, more particularly auditoriums or theatres, and other places of assembly which are analogous to theatres as regards the requirements and equipment for the ventilation and air conditioning thereof. The word "auditorium" as hereinafter employed is intended to designate such places or rooms.

It is desirable that the air supplied to such places for ventilation purposes be conditioned so as to provide the greatest comfort for the people assembled therein, and the temperature and humidity of the conditioned air necessary to provide this comfort will vary with exterior atmospheric conditions and the number of people assembled.

Heretofore, various systems have been devised for heating, ventilating and cooling such places, but such systems have been designed with a view to carefully avoiding noticeable movements of air in the auditorium in order to avoid the possibility of any drafts striking the people congregated, and prevent the people from being sensible to pronounced atmospheric changes. It is also a matter of common knowledge that people object to draft against the back of their heads or persons while a slight movement of the air against their faces is enjoyed, and that drafts of cold air around the feet are objectionable.

In the systems heretofore employed for ventilating, heating and cooling such places, it has been the practice to withdraw air from the room through suitable ducts or passages, mix it, if desired, with outside air, and return the mixed air to the auditorium, the relatively large volumes of air which are withdrawn and returned to the auditorium or admitted from the outside, or both, being conditioned prior to admission to the auditorium. In order to avoid drafts in the auditorium, the tempering of dehumidified air after the conditioning operation was accomplished by mixing it with the other air exteriorly of the auditorium, and then admitting the tempered mxture at a very low velocity to the auditorium by means of numerous ducts placed so as to distribute the air as evenly as possible throughout the auditorium.

In those prior systems, the relatively large amount of tempered air which must be handled at a low velocity requires the provision of relatively large blowers or fans and operating motors, and an extensive system of large supply and return conduits that are expensive and difficult to install and conceal in the building structure, especially in buildings such as theatres which are usually of elaborate architectural design and ornamentation.

With the positive circulation created by the ejector nozzles of this invention, it becomes unnecessary to provide an elaborate distribution of the points at which air is returned to the air conditioning apparatus or removed from the auditorium, to avoid "dead corners" or "dead spots" and therefore, the return system can be greatly simplified, and a great saving effected in the cost of the return or recirculation system.

An object of this invention is to provide an improved, practical and efficient method and system for cooling, ventilating and heating auditoriums and the like in which people congregate in considerable and varying numbers; with which desirable temperature and relative humidity conditions may be maintained in the enclosure regardless of the number of people therein or external atmospheric conditions; and with which there will be no discomfort to the people assembled in such places due to the operation of the improved method and system of heating, cooling and ventilation.

A further object of this invention is to provide an improved method and system for ventilating auditoriums and the like in which the size of apparatus required for conditioning the air and circulating the same will be relatively small and compact, in which the total number and size of the air ducts may be considerably reduced and the ducts more readily concealed within the structure.

When properly introduced, the small volume of air handled by the apparatus of this application will induce a secondary circulation amounting to three or four times the volume of the primary circulation, so that for an equal effect in the auditorium, air conditioning apparatus and ducts of from one fourth to one fifth normal size can be used. Furthermore, the discharge by a nozzle of dehumidified air in applicant's arrangement causes mixing at the nozzle of from three to four parts of room air with one part of dehumidified air, whereby the dehumidified air is reheated, so that before coming in contact with any of the people in the audience, its temperature is raised to an amount equal to three fourths or four fifths of its original depression below the theater temperature.

A still further object of the invention is to provide an improved system or apparatus for heating, cooling and ventilating auditoriums and the like which is relatively simple and inexpensive in both construction and operation, one of the important features of this improved system being the creation of a definite controlled circulation of air in the theatre or auditorium.

Various other objects and advantages will be apparent from the following description of two embodiments of the invention, and the novel features will be particularly pointed out hereinafter in connection with the appended claims.

In the accompanying drawings:

Fig. 4 is a sectional view showing a modified form of air discharge duct and nozzles.

Figure 1:
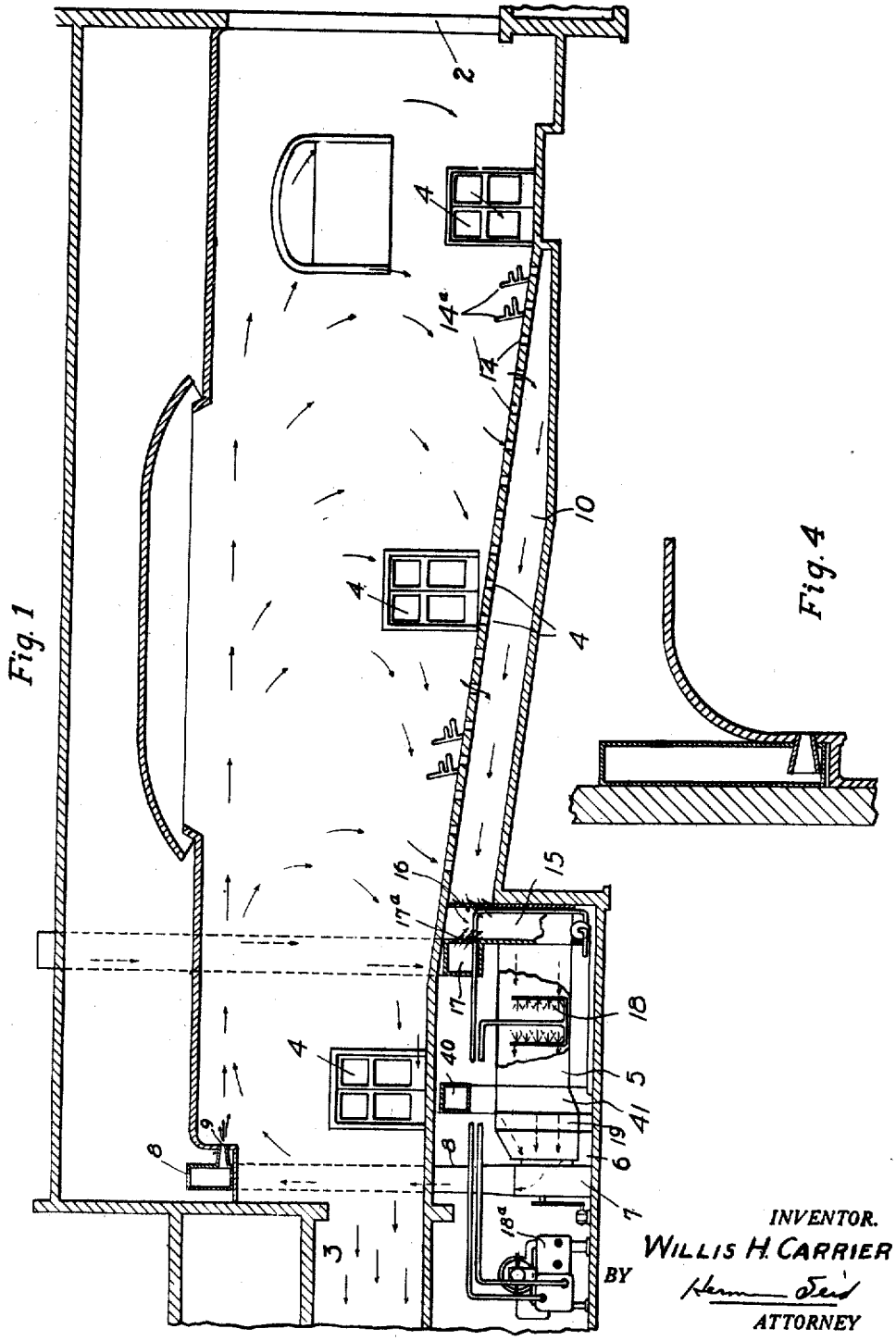
Fig. 1 is a sectional elevation of an auditorium without a balcony, in which the ventilation, heating and cooling is accomplished in accordance with this invention.
Figure 2:
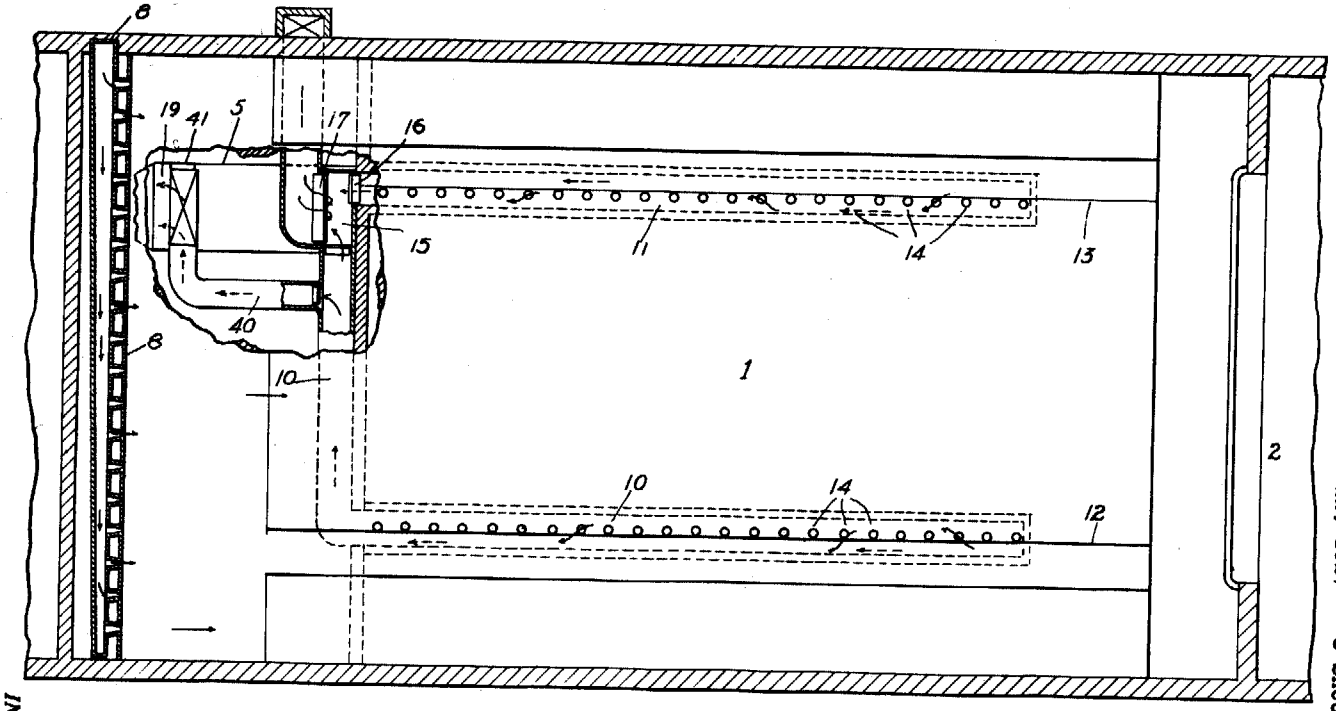
Fig. 2 is a sectional plan of the same.

In the embodiment of the invention illustrated in Figs. 1 and 2, the building has an auditorium or room 1 in which the people assemble, with a proscenium arch 2 at one end leading to the stage. Such an auditorium has a relatively high ceiling with a deep space between the ceiling and the section occupied by the audience. The entrance to the auditorium may be through one or more passages or doorways 3 at the end opposite from the stage, and the auditorium may also be provided with the usual emergency exit doors 4.

Air conditioning apparatus 5 may be located in any suitable, available space 6 in the building, such as in the basement under the rear of the auditorium, as shown in Fig. 1, or on the roof, or in upper rooms, or partially in the upper room or on the roof and partially in the basement, the exact place selected depending upon expediency and the particular details of the structure or building in which the auditorium is provided.

A blower or fan 7 for causing the circulation of air in and through the room 1 is preferably connected at its inlet side to the outlet side of the air conditioning apparatus 5, and at its outlet side is connected to a duct 8 which extends to a point adjacent the ceiling of the auditorium and then transversely across the room at a point adjacent the ceiling. A plurality of nozzles 9 are provided on the transverse stretch of the duct 8 through which the air is delivered into the room so as to direct the air from the duct 8 at high velocity into the room in the relatively deep space just below the ceiling, that is, at a point well above the lower section of the room which the people occupy.

Figure 3:
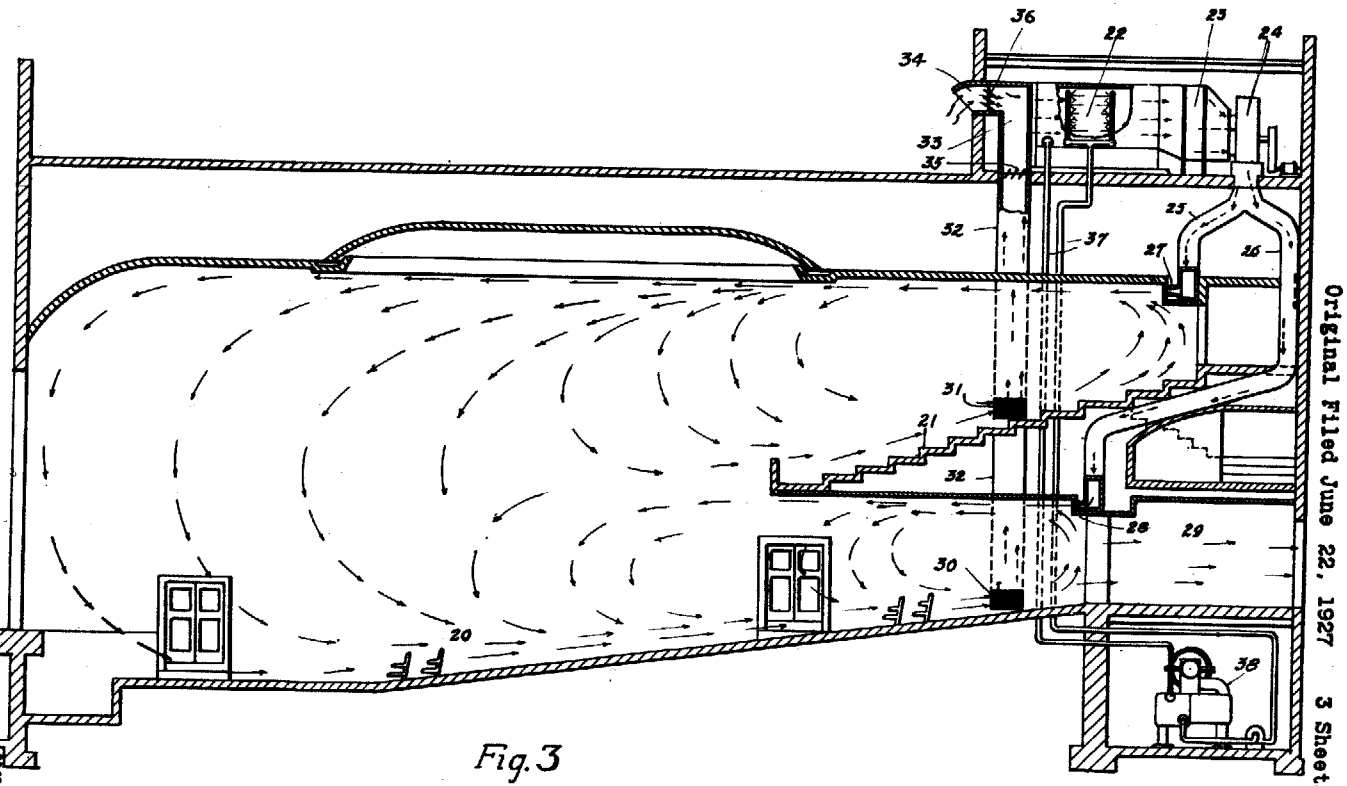
Fig. 3 is a sectional elevation of another auditorium with a balcony, and also ventilated, heated and cooled in accordance with this invention.

The duct 8 equipped with the discharge nozzles is preferably encased in the cornice or other part of the wall or ceiling of the room so as to be hidden from view. The nozzles can project from the duct and terminate substantially flush with the inner surface of the cornice or wall, as shown in Figs. 1 and 3 where sufficient space is afforded in the wall for this construction. When, however, the walls or decorative structure of the room do not afford the necessary space for a duct with outwardly projecting nozzles, the nozzles can be arranged to project inside of the duct as shown in Fig. 4, in which $8_a$ indicates the duct and $9_a$ the nozzles, in which case the duct can be placed in a space of substantially the width of the duct, and if a narrow, deep duct is used, as shown in Fig. 4, it can be enclosed in a correspondingly narrow cornice or wall space. Nevertheless the nozzles can be of sufficient length to give the required directional control of the discharging air jets.

While the ducts with the nozzles 9 may be arranged at different points spaced apart in the direction in which they open for larger rooms, they preferably, particularly for rooms of smaller or moderate size, are arranged in a row extending substantially entirely across one lateral wall of the room, as shown in Fig. 2, so that a plurality of high velocity jets of air will be directed in the same direction across the room in the upper or unoccupied part thereof. These high velocity jets of conditioned air will be discharged in such directions as to avoid directly striking the lower section of the room occupied by the people, and when the ceiling is substantially horizontal, as shown in Fig. 1, these jets of conditioned air may be directed approximately parallel and near the ceiling, so that the circulation of air caused by the jets will be along or adjacent the ceiling.

The jets act as injectors and cause a circulation of the relatively larger volume of air of the room therewith through the upper relatively deep, unoccupied space in the room, and during and by reason of such circulation the injected conditioned air is intimately mixed with and tempered by the room air which is drawn into the circulation. The mixture is then carried through the upper or unoccupied space of the room by the circulation caused by the high velocity injected air, and will descend into the lower or occupied section of the room as the circulating air loses its velocity or approaches the side of the room opposite from that where the conditioned air is injected. Some of the mixture of air moving adjacent the ceiling will descend into the lower section of the room as the mixture moves across the room, and all of the air reaching the lower or occupied section of the room will move at a relatively low velocity toward the side of the room where the conditioned air was injected, so as to complete the circulation, as shown by the arrows in Fig. 1.

Air may be withdrawn from the room and conducted to the air conditioning apparatus 5, conditioned and returned to the room through nozzles 9. When the volume of air injected into the room is greater than that withdrawn, the air displaced by the injected air may escape from the room through any suitable relief oulet, such as through the entrance passage 3 and the windows, doors and other places of leakage, since obviously auditoriums are never entirely air tight. Furthermore, the toilet and rest rooms that are provided adjacent the auditorium will usually have some ventilating means for removing to some extent the air of those rooms, and part of the air of the auditorium which is displaced may escape through those auxiliary rooms.

The air withdwrawn from the room for conditioning and return to the room is taken from the room at such point or points with reference to the occupied section of the room so as to insure a circulation of the tempered mixture into this occupied section. The occupied section being along the floor, the air withdrawn for conditioning and return will preferably be taken from the room at a point or points in or near the floor. For example, in Figs. 1 and 2, a pair of return ducts 10 and 11 may be provided under the floor of the room so as to extend in a direction from front to rear, and located preferably along the aisle spaces 12 and 13. Openings 14 to the ducts 10 and 11 are provided through the floor of the room at the edges of the aisle sections and these openings may conveniently be provided under the seats 14a in the center seat section, just at the edge of the aisles, as shown clearly in Fig. 2. The return openings may be of the mushroom or aisle-hood type, or they may be registers or grills placed either in the floor or in the walls of the room, near the floor line, and the return ducts may be arranged as required to suit the particular arrangement of the return openings.

The ducts 10 and 11 connect with a mixing chamber or main passage 15 opening into the inlet side of the air conditioning apparatus 5. The connection between the ducts 10 and 11 and the passage 15 leading to the air conditioning apparatus may be provided with dampers or shutters 16 which control the amount of air withdrawn through the ducts 10 and 11 from the room and conducted to the air conditioning apparatus. Dampers or shutters 17 control the passage of outside air through an outside air inlet 17a into the mixing chamber or passage 15. By suitably adjusting the dampers or shutters 16 and 17, the relative proportions of outside air and return air which are conveyed through the chamber or passage 15 to the air conditioning apparatus may be varied as desired. The shutters and dampers 16 and 17 may be regulated by suitable hygrometric or temperature responsive instruments common to the art and disposed at suitable points.

The air conditioning apparatus preferably includes a dehumidifying device 18, such as a spray dehumidifier through which the air to be conditioned is passed and cooled and its excess moisture removed. The liquid for the spray of the dehumidifier may be cooled by a refrigerating device 18a as usual. When necessary, on account of low relative humidities of the outside air in cold weather, unrefrigerated or warm water may be supplied to the spray device 18 or the necessary heat otherwise supplied to the conditioning apparatus for raising the humidity of the air to the required dew point. The cooled and dehumidified air is conducted through a heater 19, preferably located between the dehumidifier and the blower or circulating fan 7, and when desired, as under winter operating conditions, the temperature of the conditioned air from the device 18 may be raised to the desired extent. In winter time it may be desirable to operate the heater so as to increase the temperature of the injected air, especially when the room is being initially heated, prior to or at the beginning of occupancy of the room by the people. By such air conditioning apparatus, the air injected into the room through the nozzles 9 may be given any desired temperature and humidity, the particular temperature and humidity being regulated so that after mixing with the room air it will provide the maximum comfort to the occupants of the room.

The nozzles 9 are disposed at the rear of the assembly room, so that the circulation through the upper part of the room will be forwardly therein, with the result that the circulation in the lower or occupied section of the room will be rearwardly. Therefore, the air moving in the reverse direction in the occupied section of the room will strike the occupants from the front, which is not objectionable to them while it would be an objection to have the air current strike them from the rear. The air which moves downwardly to the floor by the circulation in the occupied section will be heated by and receive moisture from the people in the occupied section, with the result that the air striking the feet of the congregated people will be the warmest of any in the room with which the people may come in contact, and therefore, there will not be any discomfort to the occupants of the room due to cold feet.

Referring now to Fig. 3, I have illustrated the invention as applied to the type of auditorium having a balcony, and by way of example, the air conditioning apparatus is located upon the roof, although it may, if desired, be placed in the room or in the basement, as in Figs. 1 and 2. In this example, the room 20 is somewhat similar to the room 1 of Figs. 1 and 2, except that it has a deeper space below the ceiling, that is, the ceiling is considerably higher, so as to provide ample space for the balcony 21 which projects forwardly into the room from the rear wall thereof.

The dehumidifier 22 is connected through a heater 23 to the circulating fan 24 and the latter is connected at its outlet side to branch ducts 25 and 26. The branch 25 extends to a point adjacent the ceiling of the assembly room, and there extends across the rear of the room, as in Figs. 1 and 2. A plurality of nozzles 27 discharge the air from this duct 25 into the room along the rear wall adjacent the ceiling, so that the conditioned air from the branch duct 25 will be injected into the room immediately below the ceiling and toward the front of the room in a manner similar to that described in connection with Figs. 1 and 2.

The branch duct 26 extends to a point below the balcony and has a terminal extending across the room similar to the terminal of the duct 25. The terminal of the duct 26 is connected by nozzles 28 to the interior of the auditorium beneath the balcony, the nozzles 28 being also preferably arranged in a row across the rear portion of the room as to inject the conditioned air from the duct 26 forwardly into the room immediately below the balcony and well above the heads of the people congregated in the room beneath the balcony. The air displaced in the room by the injected air may escape as explained in Figs. 1 and 2, or partially or entirely through return outlet openings 30 and 31 provided adjacent the balcony floor and main floor.

The air removed through the outlets 30 and 31 will be conveyed through a conduit or passage 32 to a mixing chamber 33 which communicates with the inlet side of the dehumidifier 22. A conduit 34 connects the mixing chamber 33 with the outside atmosphere, and shutters 35 and 36 provided in the conduits 32 and 34 provide variable means for controlling the relative proportions of fresh air and return air which pass through the mixing chamber to the dehumidifier. The dehumidifier may be of the spray type having its cooling spray liquid supplied thereto and removed therefrom through pipes 37 leading to a refrigerating apparatus 38 that may be disposed, for example, in the basement. The spray dehumidifier 22, as in the arrangement shown in Figs. 1 and 2, can, when required, be employed for raising instead of decreasing the humidity of the air for supply to the room.

In an installation such as shown in Fig. 3, the air will be injected at high velocities through the nozzles 27 and 28 forwardly into the auditorium, a larger volume of air being admitted through the upper row of nozzles 27, so that the maximum circulation in the room will be along or near the ceiling of the room toward the stage, as in Figs. 1 and 2, the tempered mixture of the injected air and room air descending and moving slowly from front to rear in the lower or occupied section of the room. A portion of the mixed air will, of course, pass along the occupied portion of the balcony section as it circulates toward the nozzles 27, due to the injector action, and pass out through the outlets 31, and a portion of the air descending from the ceiling and from beneath the balcony will move along the occupied section of the main floor toward the outlets 30 and for recirculation with the air from the lower row of nozzles 28.

Any other displaced air not removed for conditioning and return to the room will escape through the stairways to the balcony, and through the entrance 29, or other relief openings, such as doors, windows or other rooms of the building. The circulation in the balcony and main floor sections which are occupied by the congregated people will always be from front to rear so that there will be no discomfort due to the movement of the air.

In both of the illustrated installations it will be observed that the tempering of the conditioned air is obtained entirely or principally within the room itself while occupied by the people and not exteriorly thereof, as has been heretofore the case. Consequently, it is only necessary to handle by the mechanical apparatus the relatively small volume of injected, dehumidified, cooled or conditioned air and not the large volume of air circulating in the room and with which it is mixed and by which it is tempered. The volume of air to be handled for any given size of room is therefore materially less with this improved system of ventilation, heating and cooling than with prior systems in which the mixing or tempering occurred principally or entirely outside of the auditorium.

With this improved system it will be observed that the total lengths of pipe or conduits required to handle the air for any given room is very considerably reduced in comparison with that required for previous systems, as it is not necessary to provide numerous supply openings disposed about the room in order to distribute the air uniformly to various parts of the room. Since a smaller volume of air is handled by mechanical apparatus in this improved system, and since the air is handled at a high velocity, the ducts for handling the air may also be made very much smaller than heretofore and the blower and operating motor may likewise be made very much smaller, so that a considerable saving is obtained, not only in the space occupied by the apparatus and conduits, but also in the original and maintenance costs of the smaller apparatus and conduits required.

Prior systems supplied air to the room at such low velocities, 200 to 400 feet per minute, as to necessitate the handling of greatly increased volumes of air, or else create a ventilating condition amounting nearly to one of stagnation, owing to the fear of drafts upon the occupants of the room. Where the cooled air was introduced into the lower part of the room, it caused great discomfort to the feet of the occupants assembled in the lower part of the room, particularly if there was any movement of the air. My improved system, in contrast to prior systems, discharges air from the injector nozzles into the room at velocities usually averaging 2000 feet or more per minute, and is designed to create a certain amount of circulation in the occupied section of the room, so as to cause the movement of air over each and every person in the audience of such a velocity, temperature and humidity condition that the sensation is pleasing rather than disturbing. The air supplied to the room through the injector nozzles is conditioned, before admission to the room, to a dew point and temperature such that when it is mixed with the air in the room, the mixed circulating air, when it reaches the occupants of the room will have the required temperature and relative humidity to afford the maximum comfort to the people. By reason of the vigorous circulation in the upper part of the room and the uniformity of circulation in the lower part of the room, I am able to perfect uniformity of temperature and humidity in all of the air which comes in contact with the audience so that there will be no discomfort of the audience, due to cold feet or chilling drafts.

An important feature of my hereindescribed injector circulating system is that by it the temperature of the air injected through the nozzles into the room is raised by mixing it in the upper portion of the room with the relatively large volume of warmer air in the room before any part of the mixed air comes in contact with the people. While nozzles are shown, it is apparent that any suitable discharge means may be employed to carry out the invention which has for its primary object the discharge of cold conditioned air in the upper portion of a room, so that it may mix with the relatively large volume of warm air in the upper part of the room, before any part of the mixed air comes in contact with the people in the zone of occupancy or lower portion of the room.

The following example affords an illustration of the operation of the system under practical conditions. In order to maintain the auditorium temperature at 75 degrees with a desirable relative humidity, air at about 51 degrees would ordinarily be introduced into the room through the injector nozzles. But experience has shown that it was entirely impractical to distribute air at 51 degrees by prior systems in a place such as an auditorium occupied by people. If, however, as in the present system, a secondary circulation in the room is introduced by the injected air in the ratio of one part of injected air to four parts of room air, the 51 degree injected air is mixed with 75 degree air of the room and the temperature of the mixture is 69 degrees. This mixed air at 69 degrees can be, and by this system is, distributed so as to reach people without causing objectionable drafts or atmospheric changes. This mixing and reheating of the air is done in the free upper space of the room itself so that the air capacity of the fan and ducts in this injector system under the operating conditions just above described is one-third that of the fan and duct capacity of systems such as heretofore used, in which the mixing of the low temperature air and air from the room is done outside of the room in the air recirculating apparatus.

It will be noted that the auditorium or space as illustrated in the drawings tapers or gradually increases in depth from one end toward the other end thereof, as is often the case in theatre structures, so that the volume of air in the room per unit of room length gradually increases from the end having the least height toward the end having the greatest height, and since the conditioned air is injected into the upper portion of a part of the room of lesser depth and in a direction toward the part of the room having greater depth, the resistance to the flow of the injected air currents progressively decreases commensurately with the increasing distance which the currents travel from the injector nozzles, and the relatively small volumes of injected air which are delivered at relatively high velocity are adapted to travel and move and mix with the strata of air in the upper part of the room substantially throughout the length of a comparatively long room and cause the whole body of air in the room to roll downwardly and backwardly through the lower portions of the room.

In a system such as herein described, in which a relatively small volume of conditioned air is injected at a relatively high velocity into the auditorium for conditioning a relatively much larger volume of air in the room, it is desirable to maintain a substantially constant volume of the air supplied to the injector nozzles in order to obtain a substantially constant discharge velocity from the nozzles, and therefore a uniform circulation and mixture of the air in the room. When, however, the auditorium is sparsely occupied, the heat and moisture produced in the auditorium by the people is of course much less, and consequently a smaller volume of conditioned air would suffice to give comfort to the few people in the audience. But if the same volume of dehumidified air is discharged into the room as when it is filled with people, heating means would be necessary to bring the dehumidified air up to the desired temperature for delivery to the room. When, therefore, the auditorium is empty or only sparsely occupied, it may be desirable to recirculate more or less of the air withdrawn from the room and return it to the room without passing it through the air conditioning device, mixing this recirculated air with the conditoned or dehumidified air coming from the air conditioner and discharging the mixture into the room, thereby utilizing the recirculated air to heat or temper the conditioned air, and to this extent, saving fuel for heating the air delivered to the room.

To make this possible, a by-pass or branch duct may be provided, for instance as shown at 40, Figs. 1 and 2, connecting the air circulating fan with the return air duct 10 around or outside of the air dehumidifying or conditioning device. The by-pass duct 40, as shown, connects with a mixing chamber 41 between the dehumidifier 18 and the heater 19, and is controlled by a damper 42 so that the proportions of return air passed through or by-passed around the dehumidifier can be controlled by the operation of the dampers 16 and 42 in accordance with the requirements for the auditorium. All or any required proportion of the return air can thus be directed through or around the air conditioning or dehumidifying device.

It will be obvious that various changes in the details, which have been herein described and illustrated in order to explain the nature of the invention, may be made by those skilled in the art within the principle and scope of the invention as expressed in the appended claims.

I claim as my invention:

1. The method of ventilating and attemperating a room in which people congregate and which is so designed that the people normally face the front (or stage portion) of the room, which comprises injecting air into the room in a direction towards the front or stage end of the room and well above the lower portion thereof and the heads of the people therein, and in a direction to avoid a direct blast of the injected air towards the people and at a velocity sufficiently high to cause an intimate mixture of the injected air with the other air in the room and an active circulation of the mixed air toward the people, and withdrawing air from said room through the section occupied by the people.

2. The method of ventilating and attemperating a room in which people congregate and which is so designed with seats that the people normally face the front of the room, which comprises injecting air at a high velocity into the room in a direction towards the front of the room and well above the heads of the people therein, and in a direction to avoid a direct blast of the injected air towards the people, and withdrawing air from the rear of the section of the room occupied by the people and below the level at which the air was injected into the room, whereby the injected air will be first mixed with and temperated by the air of the room in the section above the heads of the people while moving forwardly toward the front or stage portion and in the upper section of the room, and circulated toward the rear of the room in the lower section occupied by the people.

3. The method of ventilating and attemperating a room in which people congregate in relatively large numbers and having a relatively deep space below the ceiling and above the lower section occupied by the people, which comprises continually withdrawing air from said lower section of the room, dehumidifying the removed air to a temperature too cold for comfort, continuously injecting this dehumidified air as jets at a high velocity directly and at unimpaired velocity into said space adjacent and below the ceiling of the room in an approximately horizontal direction, whereby the injected dehumidified air will be mixed with the air of the room by forced circulation therewith in said space, the dehumidified air being reheated to a temperature at a relatively small differential from that of the room, before reaching the zone of occupancy by the air of the room as it diffuses through the air of the room toward the point of withdrawal near the floor.

4. The method of ventilating and attemperating a room in which people congregate in relatively large numbers, which comprises providing suitably conditioned air for supply to the room, said air consisting of a mixture of outside air and air withdrawn from the room, injecting this conditioned air at a temperature too cold for comfort directly into the room well above the occupied section and in an approximately horizontal direction and in jets directly into the room at a velocity sufficiently high to cause a circulation of a relatively larger volume of room air for mixture with the injected air in the upper unoccupied section of the room whereby the conditioned air will be reheated to a relatively comfortable temperature, and also cause a movement of the tempered air mixture into the occupied section, and varying the proportions of outside air and air withdrawn from the room in said conditioned air injected into the room in accordance with the ventilation requirements of the room without variation in the quantity delivered to the room.

5. The method of ventilating and attemperating a room in which people congregate and which is provided with seats facing the front of the room, which comprises providing suitably conditioned air for supply to the room, said air consisting of a mixture of fresh outside air and air withdrawn from the room, injecting volumes of said conditioned air forwardly into the room adjacent the ceiling thereof and at a velocity sufficiently high to cause an intimate mixture of the injected air with the other air in the room and an active circulation of a larger volume of the mixed injected and room air, and permitting the escape of air from the room so that the circulation of the mixed air is forwardly in the upper portion of the room and then downwardly and through the portion of the room occupied by the people.

6. The method of ventilating and attemperating a room in which people congregate and which is provided at its rear portion with a balcony, which comprises injecting volumes of air forwardly into the room adjacent the ceiling thereof and at a velocity sufficiently high to cause an intimate mixture of the injected air with the other air in the room and an active circulation of a larger volume of the mixed injected and room air, and permitting the escape of air from the room so as to cause the circulation of the mixed air in the room forwardly in the upper portion of the room and then downwardly and through the portion of the room occupied by the people.

7. The method of ventilating and attemperating a room in which people congregate and which is provided at its rear portion with a balcony, which comprises injecting volumes of air forwardly into the room adjacent the ceiling thereof and adjacent the ceiling under the balcony and at a velocity sufficiently high to cause an intimate mixture of the injected air with the other air in the room and an active circulation of a larger volume of the mixed injected and room air, and permitting the escape of air from the room so as to cause the circulation of the mixed air in the room forwardly in the upper portion of the room and then downwardly and through the occupied lower and balcony portions of the room.

8. A system for ventilating and attemperating a room in which people congregate in considerable numbers, which comprises a room having a relatively deep space between the ceiling and the lower section occupied by the people, the depth of said space greatly exceeding the depth of the section so occupied, air conditioning apparatus, means including nozzles opening directly into said space constructed to inject the conditioned air from said apparatus as jets directly into the interior and upper unoccupied space of said room at a high velocity and in a direction to avoid direct blasts into the lower occupied section, and to cause the injected air to mix with and be tempered by the air of the room in said deep space above the occupied section and the room being so shaped that the mixture is circulated into and in the opposite direction through the occupied section, and means for removing air from the occupied section of the room and conducting it to said apparatus for conditioning treatment and return to the room through the injector means.

9. A ventilating and attemperating system for a room in which people congregate which comprises a room provided in its lower portion with a section having forwardly facing seats arranged to be occupied by the people, air conditioning apparatus, means for injecting conditioned air from said apparatus forwardly at considerable velocity into the space of said room above the seats of the occupied section, and means for removing displaced air from the seat section of the room.

10. A ventilating and attemperating system for a room in which people congregate, which comprises a room provided in its lower portion with a section having forwardly facing seats arranged to be occupied by the people, air conditioning apparatus, means for injecting conditioned air from said apparatus forwardly at considerable velocity into the space of said room above the seats of the occupied section, and means for removing air from the rear portion of the seat section of the room whereby the air currents in the occupied section will be from front to rear.

11. A ventilating and attemperating system for a room having a balcony at its rear end in which people congregate, which comprises air conditioning apparatus, means for injecting conditioned air from said apparatus at a high velocity forwardly into the spaces of said room adjacent the main ceiling thereof and also adjacent the ceiling under the balcony thereof and in a direction to avoid direct blasts into the occupied section of the room, whereby the injected conditioned air will first be mixed with and tempered by the warm air of the room and then circulated therewith in the space above the occupied sections, and means for removing portions of the circulated mixed air from the occupied balcony and lower sections of the room, whereby strong drafts in the occupied balcony and lower sections of the room will be avoided.

12. The method of ventilating and attemperating a large and relatively deep space in which people congregate, which comprises confining the space into a tapering form whereby the vertical depth increases more or less gradually from one end of the space to the other and the volume of air per unit of length gradually increases from the end having the least height to the end having the greatest height, injecting specially directed currents of freshly conditioned air and of relatively small volume into the upper portion of the said space at its end of least depth, said currents projected at a velocity sufficiently high to cause an active circulation of the freshly conditioned air whereby it mixes with the upper strata of air already filling the space and causes the air mixture to be moved substantially throughout the length of the space and so that the increasing depth of the air in the space into which the freshly conditioned air and its mixture is projected offers less resistance commensurately with the increasing distance to which the projected air travels, said circulation within the space providing a proportional downward displacing action by the air mixture at intervals along its path whereby the entire body of air within the tapering air space is caused to roll downward and backward through the lower zone occupied by the assemblage of people.

13. The method according to claim 12 further characterized, by withdrawing a portion of the circulating air from parts of the space occupied by the people, mixing the said withdrawn air with fresh air, conditioning and cooling the air mixture so provided and thereafter projecting the same, unmixed with other air, directly into the upper strata of the air within the space in which the people congregate.

14. The method of ventilating and attemperating a room provided at its rear portion with a balcony and wherein people congregate, which comprises injecting volumes of conditioned air forwardly into the room from the balcony end and adjacent to the ceiling thereof and at a velocity sufficiently high to cause an intimate mixture of the injected air with the other air in the room and causing thereby an active circulation of the mixed air whereby downward currents are induced from the zone of the ceiling into the lower part of the room where the people congregate and thence backward, dividing its backward flow between the space under the balcony and over and adjacent to the balcony, simultaneously withdrawing a portion of the circulating air both from above the balcony and from below the same, reconditioning the said withdrawn air, and thereafter recirculating the same through the room.

15. The method according to claim 16 wherein further, portions of conditioned air are injected forwardly adjacent to the ceiling under the balcony at a velocity sufficiently high to cause a mixture of said injected air and the returned air through the space below the balcony and causing thereby a downward current of air from the ceiling below the balcony to where the people congregate, and thence backward in association with the air passing rearwardly from the main portion of the room, the volume and velocity of the air injected below the balcony being less than that injected above the balcony and near the ceiling of the room.

16. The method according to claim 14, wherein further, the conditioned air which is injected at the rear and upper portion of the room adjacent to the ceiling consists of a mixture of fresh air and return air withdrawn from the room, and wherein also a portion of the air from under the balcony is caused to escape from the room in volumes substantially equivalent to the volumes of fresh air forming a part of the injected air above the balcony.

17. The method of ventilating and attemperating a room provided at its rear portion with a balcony and wherein people congregate, which consists in injecting volumes of conditioned fresh air forwardly into the room from the balcony end and adjacent to the ceiling thereof and at a velocity sufficiently high to cause an intimate mixture of the injected air with the other air in the room and causing thereby an active circulation of the mixed air and inducing downward currents from the zone of the ceiling into the lower part of the room where the people congregate and thence backward and dividing its flow between the space under the balcony and over and adjacent to the balcony, withdrawing a portion of the circulating air from above the balcony, reconditioning the said withdrawn air and recirculating it as injected air and simultaneously causing escape of air from under the balcony in volumes substantially equal to the volumes of fresh air admitted above the balcony and thereby assisting the circulation from front to rear of the room and through the space under the balcony.

18. A ventilating and attemperating system for a space in which people congregate, which comprises an audience room having a balcony in its rear portion dividing the rear part of the room in a fore and aft direction into upper and lower room portions to the rear of the main room portion, said several room portions provided with seats, air conditioning apparatus, means for injecting conditioned air from said apparatus forwardly into the room space above the balcony and above the seats thereof and in a direction to avoid direct blast into the room spaces in which said seats are located whereby the injected conditioned air will be mixed with and tempered by the warm air of the room space above the occupied seat portions, the structure of the lower seat portions being such as to cause the air mixture to be circulated rearwardly through the said seat portions, and means for permitting a portion of the rearwardly circulated air to escape from a rear seating portion of the room.

19. The method of ventilating and providing desired atmospheric conditions in a room in which people may congregate in considerable number and which has a relatively deep space below the ceiling and above the lower section occupied by the people, which comprises withdrawing air from said lower section of the room, injecting intensively conditioned air, unmixed with other air, in jets at a high uniform velocity directly and without impairment to its velocity into said space adjacent the ceiling of the room and in an approximately horizontal direction, whereby the injected air will be mixed with and reheated to a relatively comfortable temperature above the section occupied by the people by the other air in the room, and an active circulation of the mixed air and the movement of the mixed air through the said lower section of the room will be caused, and determining the condition of the air which is injected into the room by using for injection into the room the air withdrawn from the room, said withdrawn air being conditioned to a desired degree before being injected into the room without variation in the velocity of air discharged into said room.

20. The method of ventilating and providing desired atmospheric conditions in a room in which people congregate and which has a relatively deep space below the ceiling and above the lower section occupied by the people, which comprises withdrawing air from said lower section of the room, injecting specially conditioned air in jets at a high velocity directly and with its velocity unimpaired into said space adjacent the ceiling of the room and in an approximately horizontal direction, whereby the injected air will be mixed with and tempered by the other air in the room and an active circulation of the mixed air and the movement of the mixed air through said lower section of the room will be caused, and determining the condition of the air which is injected into the room by using for injection into the room desired proportions of fresh outside air, and air withdrawn from the room, and said withdrawn air being recirculated and injected unconditioned into the room or reconditioned in part before being injected into the room without variation in the quantity of air delivered to the room.

21. The method of ventilating and attemperating the air in a relatively large and deep enclosure in which people congregate in considerable numbers, which comprises withdrawing air from the occupied section of the room, forcing a portion of the withdrawn air, undiluted by other air from the room, in jets at a relatively high velocity into said inclosure, the discharge velocity of the jet remaining substantially unimpaired, and in a direction to avoid direct blasts into the occupied section, to forcibly circulate the air already in the enclosure through the occupied section, and cause a mixture of the injected air with the air of the room within the room before the injected air reaches the occupied section, the mixture reaching the occupied section at a reduced velocity insufficient to cause drafts and conditioning the injected air as to freshness, temperature and humidity, prior to its injection into said enclosure, and to such an extent different from that desired in the enclosure that when diluted, tempered and modified by mixture with the air in the enclosure before reaching the occupied section, it will have a desired condition when reaching the occupied section.

22. The method of ventilating and attemperating the air in an enclosure in which people congregate and of the type having an occupied section with seats arranged to face in the same direction, comprising injecting air into said enclosure in the direction in which the seats face, at a relatively high velocity and well above the occupied section, and removing displaced air from the occupied section in a manner to insure a circulation of the injected air forwardly through the upper section of the enclosure and then rearwardly at a lower velocity through the occupied section.

23. The method of ventilating and providing desired atmospheric conditions in a room designed for the congregation of people in considerable numbers, and which has a relatively deep space above and fully open into the lower section occupied by said people, which comprises discharging conditioned air directly into the upper part of said room by a jet whose velocity of discharge is not impaired and in a direction to avoid direct blasts into said occupied section, and at a uniform and relatively high velocity sufficient to cause the circulation of a relatively large volume of the other air of the room, varying the condition of the discharged air and concurrently maintaining the same uniform velocity of discharge into said room to produce desired atmospheric conditions in said room, and withdrawing air from the occupied section of the room, whereby the discharge conditioned air will move a substantial distance across the room in said deep space and be mixed with and tempered by the air of the room to form a mixture at a comfortable temperature, and then reach and pass through the occupied section of the room at a reduced velocity free of drafts.

24. Apparatus for ventilating and providing desired atmospheric conditions in a room designed for the congregation of people in considerable numbers, and which has a relatively deep space above and fully open into the lower section occupied by the people, which comprises a nozzle with its passage tapered to a restricted orifice opening directly into said deep space and arranged to discharge air therein in a direction to cause movement of said discharged air across the top of said deep space, means for supplying conditioned air unmixed with other air to said nozzle at a uniform rate and at a pressure sufficient to cause the air to be discharged into said deep space at a relatively high and uniform velocity sufficient to cause the circulation of a relatively larger volume of the other air of the room, means for withdrawing air from the occupied section of said room, and means for variably conditioning the air supplied by said nozzle to said room without altering the uniform velocity of the air discharged from said nozzle, whereby the conditioned air after discharge into said deep space will be first mixed with and tempered by the other air in said deep space, and the mixture then circulated through said lower section to produce therein desired atmospheric conditions.

25. The method of ventilating and air conditioning a room in which people congregate, which comprises injecting intensively dehumidified air directly and unmixed with other air into the room well above the lower portion thereof and the heads of the people therein, and in a direction to avoid a direct blast of the injected air toward the people and at a velocity sufficiently high to cause an intimate mixture at a comfortable temperature of the injected air with the other air in the room and an active circulation of the mixed air toward the people at a greatly reduced velocity.

26. The method of ventilating and air conditioning a room in which people congregate, which comprises discharging dehumidified air directly and unmixed with other air into the room above the lower portion thereof and the heads of the people therein, and at a velocity sufficiently high to cause an intimate mixture of the discharged air with the other air above the zone of occupancy in the room, the velocity being sufficient to cause a secondary circulation of room air much greater in volume than the conditioned air whereby the conditioned air will be reheated to a comfortable temperature and reach the zone of occupancy at a reduced velocity insufficient to cause noticeable drafts.

27. The method of ventilating and air conditioning a room in which people congregate, which comprises discharging relatively intensively conditioned air directly and unmixed with other air into the room at a sufficiently high velocity so that it will first reach the upper portion of the room well above the heads of the people in the room, and cause an intimate mixture of the conditioned air with the other air in the room and an active circulation of the mixed air toward the people in the lower portion of the room at a temperature more moderate than that of the conditioned air and at a velocity insufficient to cause uncomfortable air movements.

28. A method of ventilating and air conditioning a room in which people congregate which comprises withdrawing air from a lower section of the room, dehumidifying the withdrawn air to a temperature too cold for comfort, discharging the dehumidified air directly into the room at a velocity sufficient to carry the air first into an area above the zone of occupancy and then into the zone of occupancy, the discharged air entering the room at the point of discharge with its velocity unimpaired, the velocity being sufficiently high to cause the production of a secondary circulation of room air greater in volume than the discharged conditioned air so that the conditioned air will be reheated to a comfortable temperature during its movement above the zone of occupancy, the conditioned air mixed with room air entering the zone of occupancy at a reduced velocity insufficient to cause unpleasant sensation to people within the zone of occupancy, the mixture passing through the zone of occupancy to a point of withdrawal in the lower section of the room.

WILLIS H. CARRIER.

CERTIFICATE OF CORRECTION.

Reissue No. 19,263. August 7, 1934.

WILLIS H. CARRIER.

It is hereby certified that error appears in the printed specification of the above numbered patent requiring correction as follows: Page 1, line 44, for "mxture" read mixture; page 2, line 135, for "withdwrawn" read withdrawn; page 7, line 7, claim 15, for "claim 16" read claim 14; and page 8, line 29, claim 23, for "discharge" read discharged; and that the said Letters Patent should be read with these corrections therein that the same may conform to the record of the case in the Patent Office.

Signed and sealed this 9th day of July, A. D. 1935.

Bryan M. Battey
Acting Commissioner of Patents.

(Seal)